United States Patent
Kihara

(10) Patent No.: US 11,573,760 B2
(45) Date of Patent: Feb. 7, 2023

(54) METHOD FOR CONTROLLING DISPLAY APPARATUS, DISPLAY APPARATUS, AND METHOD FOR CONTROLLING IMAGE PROCESSING APPARATUS

(71) Applicant: SEIKO EPSON CORPORATION, Tokyo (JP)

(72) Inventor: Hirohiko Kihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/583,316

(22) Filed: Jan. 25, 2022

(65) Prior Publication Data

US 2022/0236941 A1    Jul. 28, 2022

(30) Foreign Application Priority Data

Jan. 26, 2021 (JP) ............................. JP2021-010080

(51) Int. Cl.
*G06F 3/14* (2006.01)
(52) U.S. Cl.
CPC .......... *G06F 3/1454* (2013.01); *G06F 3/1423* (2013.01)
(58) Field of Classification Search
CPC ................. G06F 3/1454; G06F 3/1423; G06F 2203/04803; G09G 5/14; G09G 2370/20
See application file for complete search history.

(56) References Cited

U.S. PATENT DOCUMENTS

| 8,656,302 B2 * | 2/2014 | Nagano | H04N 21/4312 345/530 |
| 2012/0026189 A1 * | 2/2012 | Yokoyama | H04N 21/4532 345/619 |
| 2015/0042561 A1 * | 2/2015 | Kubota | G06F 3/1454 345/156 |

FOREIGN PATENT DOCUMENTS

JP    2012-032508 A    2/2012

\* cited by examiner

*Primary Examiner* — Koosha Sharifi-Tafreshi
(74) *Attorney, Agent, or Firm* — Oliff PLC

(57) ABSTRACT

A method for controlling a display apparatus includes acquiring a plurality of first images from a plurality of first terminals, displaying the plurality of first images on a first screen via a display device, storing a maximum number of first images to be placed on the first screen in a storage circuit, in response to a signal transmitted from a second terminal that supplies a second image and requesting display of the second image, permitting the second terminal to display a second screen containing only the second image via the display device when the number of first images on the first screen is equal to the maximum number, and in response to the signal transmitted from the second terminal, permitting the second terminal to place the second image on the first screen when the number of first images being placed on the first screen is smaller than the maximum number.

6 Claims, 8 Drawing Sheets

METHOD FOR CONTROLLING DISPLAY APPARATUS, DISPLAY APPARATUS, AND METHOD FOR CONTROLLING IMAGE PROCESSING APPARATUS

The present application is based on, and claims priority from JP Application Serial Number 2021-010080, filed Jan. 26, 2021, the disclosure of which is hereby incorporated by reference herein in its entirety.

BACKGROUND

1. Technical Field

The present disclosure relates to a method for controlling a display apparatus, a display apparatus, and a method for controlling an image processing apparatus.

2. Related Art

JP-A-2012-32508 discloses a display apparatus that changes the configuration of an overall image to be projected on a screen by dragging and dropping an icon of a terminal apparatus into an individual image placement area formed of four display target areas.

The technology described in JP-A-2012-32508, however, forces a user to perform a complicated operation to display a new individual image in the state in which the number of display target areas is equal to the number of displayed individual images because the user needs to replace a currently displayed individual image with the new individual image.

SUMMARY

An aspect relates to a method for controlling a display apparatus, the method including acquiring a plurality of first images from a plurality of first terminals, displaying a first screen on which the plurality of first images are placed via a display device, storing a maximum number of first images to be placed on the first screen in a storage circuit, in response to a signal transmitted from a second terminal that supplies a second image and requesting display of the second image, permitting the second terminal to display a second screen containing the second image via the display device when the number of first images is equal to the maximum number, and permitting the second terminal to place the second image on the first screen when the number of first images is smaller than the maximum number.

Another aspect relates to a display apparatus including a communication circuit that acquires a plurality of first images from a plurality of first terminals, a display device that displays a first screen on which the plurality of first images are placed, a storage circuit that stores a maximum number of first images to be placed on the first screen, and a processing circuit that in response to a signal transmitted from a second terminal that supplies a second image and requesting display of the second image, permits the second terminal to display a second screen containing the second image on the display device when the number of first images is equal to the maximum number, and permits the second terminal to place the second image on the first screen when the number of first images is smaller than the maximum number.

Another aspect relates to a method for controlling an image processing apparatus, the method including acquiring a plurality of first images from a plurality of first terminals, transmitting a first screen on which the plurality of first images are placed to a display device, storing a maximum number of first images to be placed on the first screen in a storage circuit, in response to a signal transmitted from a second terminal that supplies a second image and requesting display of the second image, permitting the second terminal to display a second screen containing the second image via the display device when the number of first images is equal to the maximum number, and permitting the second terminal to place the second image on the first screen when the number of first images is smaller than the maximum number.

DESCRIPTION OF EXEMPLARY EMBODIMENTS

Figure 1:
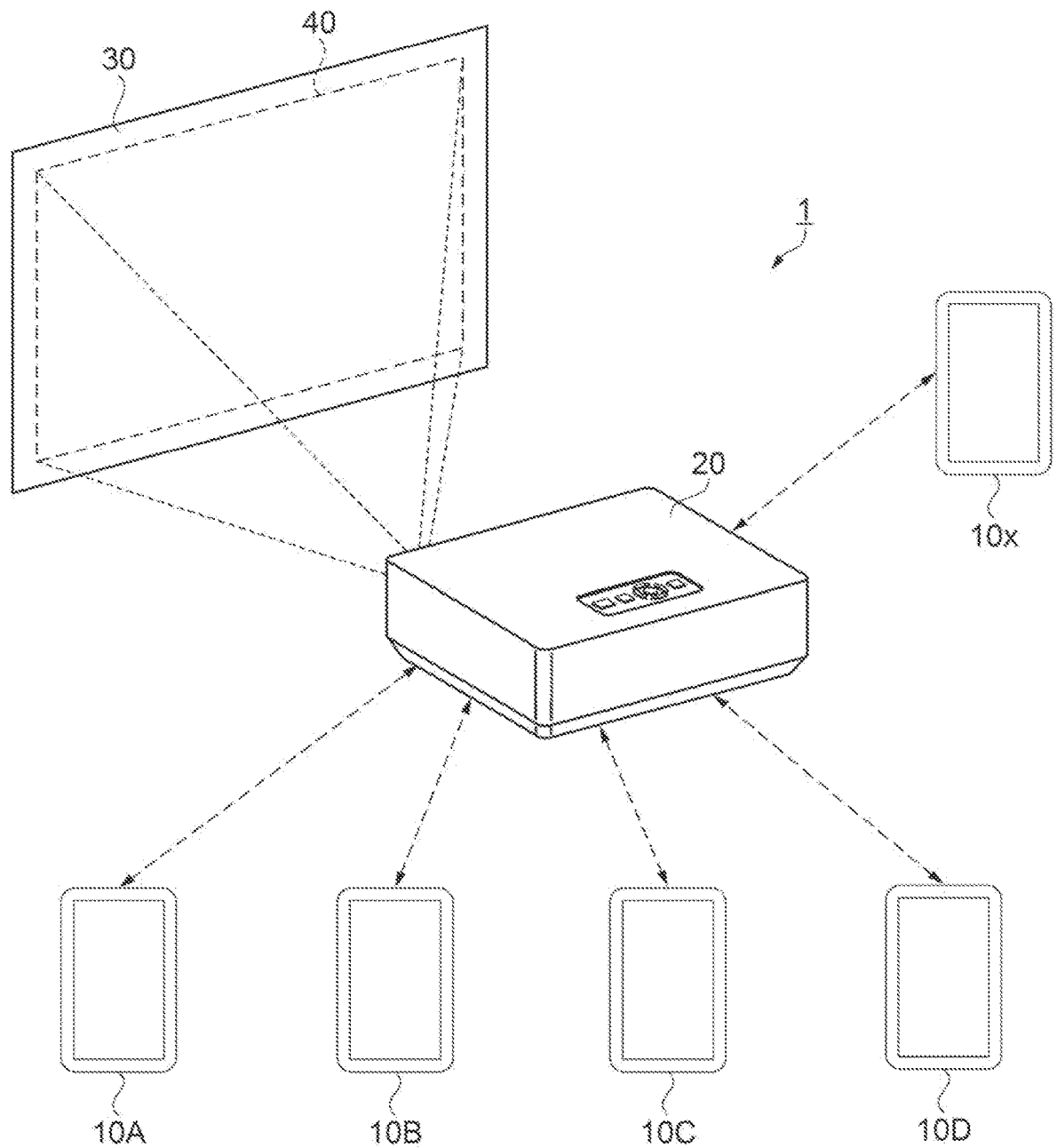
FIG. 1 is a diagrammatic view for describing a display system according to an embodiment.

An embodiment of the present disclosure will be described below with reference to the drawings. In the drawings, the same or similar elements have the same or similar reference characters, and no duplicate description thereof will be made in some cases. The embodiment presented below illustrates a system for embodying the technical idea of the present disclosure and an apparatus and a method used in the system. The technical idea of the present disclosure does not restrict the type and configuration of each apparatus, a network topology, a series of processes, and other factors to those described below.

A display system 1 in the embodiment includes a plurality of first terminals 10A, 10B, 10C, and 10D, a second terminal 10X, and a display apparatus 20, as shown in FIG. 1. In the example shown in FIG. 1, the display apparatus 20 is a projector that displays a video 40 by projecting light onto a screen 30. The display apparatus 20 may be a flat panel display apparatus or any other display apparatus. The flat panel display apparatus includes, for example, a liquid crystal display apparatus, a plasma display apparatus, and an organic electroluminescence display apparatus.

The plurality of first terminals 10A to 10D and the second terminal 10X are each a computer apparatus having the function of supplying the display apparatus 20 with image data representing an image. In the following description, when the plurality of first terminals 10A to 10D and the second terminal 10x are not particularly distinguished from one another, any of the terminals is simply referred to as a "terminal 10". In the example shown in FIG. 1, the terminal 10 is a smartphone. The terminal 10 may instead be a tablet terminal, a laptop computer, a desktop computer, or any other computer apparatus.

Figure 2:
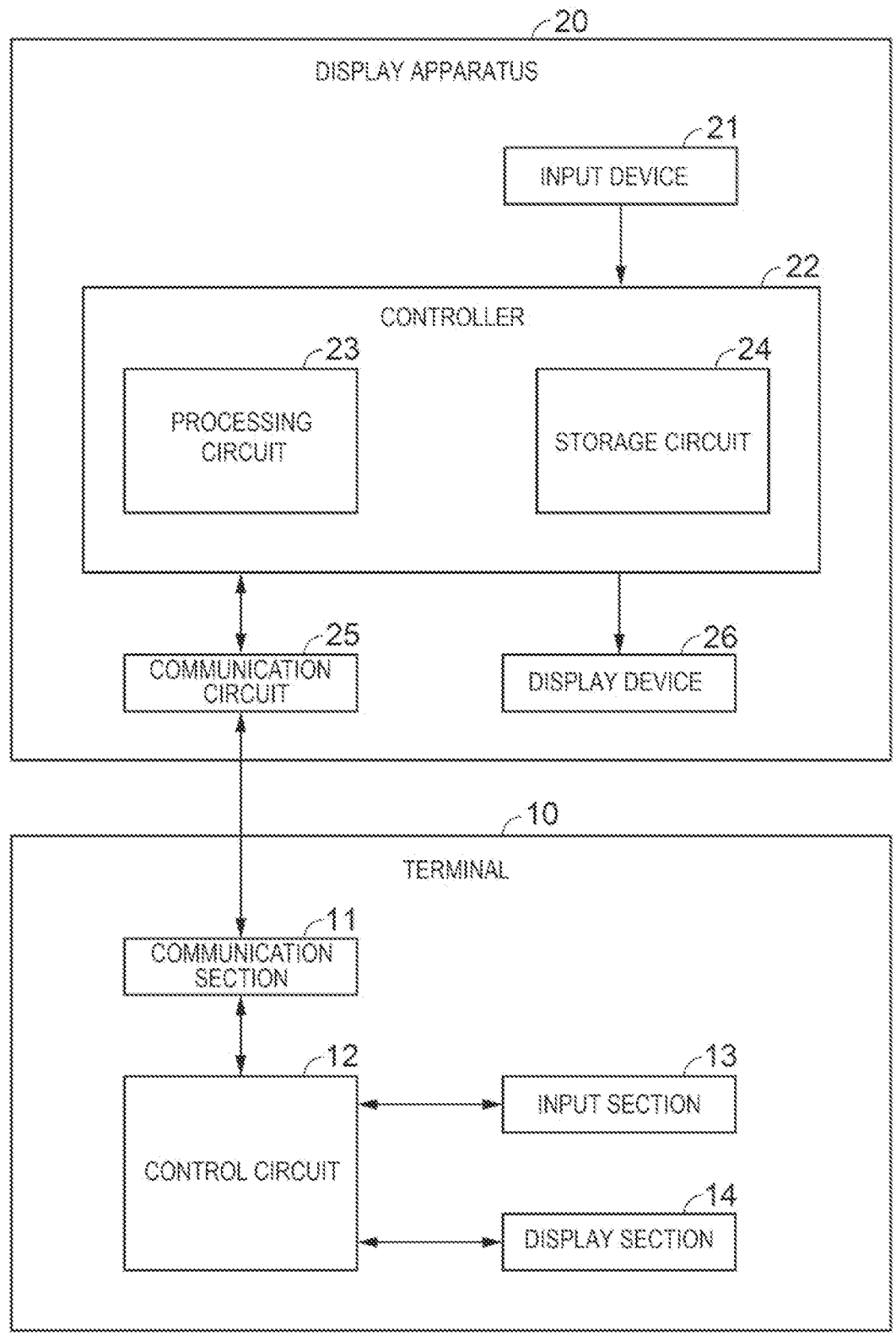
FIG. 2 is a block diagram for describing the display system according to the embodiment.

The display apparatus 20, includes, for example, an input device 21, a controller 22, a communication circuit 25, and a display device 26, as shown in FIG. 2. The input device 21 accepts a user's operation and outputs a signal according to the user's operation to the controller 22. The input device 21 can, for example, be any of a variety of input apparatuses, such as push buttons, a touch sensor, and a pointing device. The input device 21 can still instead be a wireless or wired remote controller.

The controller 22 includes a processing circuit 23 and a storage circuit 24. The processing circuit 23 forms a computer processing apparatus that processes computation necessary for the action of the display apparatus 20. The processing circuit 23 achieves a variety of functions of the display apparatus 20 that are described in the embodiment, for example, by executing a control program stored in the storage circuit 24. A processing apparatus that forms at least part of the processing circuit 23 can, for example, be any of a variety of logical computation circuits, such as a central processing unit (CPU), a digital signal processor (DSP), a programmable logic device (PLD), and an application specific integrated circuit (ASIC). The processing circuit 23 may be formed of an integrated hardware component or a plurality of separate hardware components.

The storage circuit 24 is a computer readable recording medium that stores, for example, the control program and a variety of data for a series of processes necessary for the action of the display apparatus 20. The storage circuit 24 can, for example, be a semiconductor memory. The storage circuit 24 is not limited to a nonvolatile auxiliary storage apparatus and may include a volatile primary storage apparatus, such as a register and a cash memory. At least part of the storage circuit 24 may be formed by part of the processing circuit 23. The storage circuit 24 may be formed of an integrated hardware component or a plurality of separate hardware components.

The communication circuit 25 is communicably coupled to the terminal 10 by establishing a communication link with the terminal 10 under the control of the processing circuit 23. The communication link may be a wired or wireless communication link or the combination of a wired communication link and a wireless communication link. That is, the communication circuit 25 may be directly coupled to the terminal 10 or indirectly coupled to the terminal via another communication apparatus. The communication circuit 25 may include, for example, an antenna via which a signal is transmitted and received, a circuit that processes the signal transmitted over a communication link, and a receptacle into which a plug of a communication cable is inserted. The communication circuit 25 receives image data transmitted from the terminal 10.

The display device 26 includes, for example, a light source, a display element, such as a liquid crystal panel having a plurality of pixels, and an optical system including lenses, mirrors, and other optical components. The processing circuit 23 generates a drive signal that drives the display element based on the image data that the communication circuit 25 receives from the terminal 10. The display element modulates the light emitted from the light source in accordance with the drive signal. The display device 26 displays the video 40 based on the image data by projecting light having traveled through the display element onto the screen 30 via the optical system under the control of the processing circuit 23. The display device 26 can thus display an image acquired from the terminal 10.

The terminal 10 includes a communication section 11, a control circuit 12, an input section 13, and a display section 14. The communication section 11 is a communication interface communicably coupled to the display apparatus 20 by establishing a communication link with the display apparatus under the control of the control circuit 12. The communication section 11 may include, for example, an antenna via which a radio signal is transmitted and received, a receptacle into which a plug of the communication cable is inserted, and a circuit that processes the signal transmitted over a communication link. The communication section 11 transmits image data representing an image to the display apparatus 20 under the control of the control circuit 12.

The control circuit 12 includes a processing apparatus, such as a CPU, and a storage apparatus, such as a semiconductor memory. The control circuit 12 processes computation necessary for the action of the terminal 10. The control circuit 12 achieves a variety of functions of the terminal 10 that are described in the embodiment, for example, by executing a program stored in the storage apparatus. The storage apparatus of the control circuit 12 stores a program and a variety of data for a series of processes necessary for the action of the terminal 10. The control circuit 12 may be formed of an integrated hardware component or a plurality of separate hardware components.

The input section 13 is an input apparatus that accepts the user's operation and outputs a signal according to the user's operation to the control circuit 12. The input section 13 can include, for example, a keyboard, a variety of switches, or a pointing device. The display section 14 is, for example, a flat panel display. The input section 13 and the display section 14 may be a touch panel display that is an integrated input and display section.

The first terminals 10A to 10D each supply the display apparatus 20 with a first image by transmitting image data representing the first image to the display apparatus 20. The second terminal 10x supplies the display apparatus 20 with a second image by transmitting image data representing the second image to the display apparatus 20. The terminal 10 transmits a request signal to the display apparatus 20 in response to the user's operation performed on the input section 13, the request signal requesting the display apparatus 20 to display an image supplied thereto. The display apparatus 20 permits the terminal 10 to display the image in response to the request signal transmitted from the terminal 10.

For example, assume a case where the first terminal 10A requests the display apparatus 20 that is not displaying an image from any terminal 10 to display the first image. The control circuit 12 of the terminal 10A transmits a request signal requesting the display apparatus 20 to display the first image to the display apparatus 20 via the communication section 11 in response to the user's operation performed on the input section 13. The display apparatus 20 permits, in response to the request signal, the first terminal 10A to display a first screen formed of the single first image. It is noted that the first screen has what is called screen division function of placing a plurality of first images.

Specifically, the processing circuit 23 of the display apparatus 20 reads a maximum number of images to be placed on the first screen from the storage circuit 24 in response to the request signal. To this end, the storage circuit 24 stores in advance the maximum number of images to be placed on the first screen. The maximum number is 4, for example, in a case where images are arranged in a 2×2 matrix on the first screen. The processing circuit 23 evaluates whether or not the number of first images currently placed on the first screen is equal to the maximum number of images that can be placed on the first screen. When the number of first images being placed on the first screen is smaller than the maximum number, the processing circuit 23 transmits a permission signal that permits the display of the first images to the first terminal 10A via the communication circuit 25. That is, when the display apparatus 20 has not yet displayed an image from any terminal 10, that is, when the number of first images is 0, the display apparatus 20 transmits the permission signal to the first terminal 10A.

Figure 3:
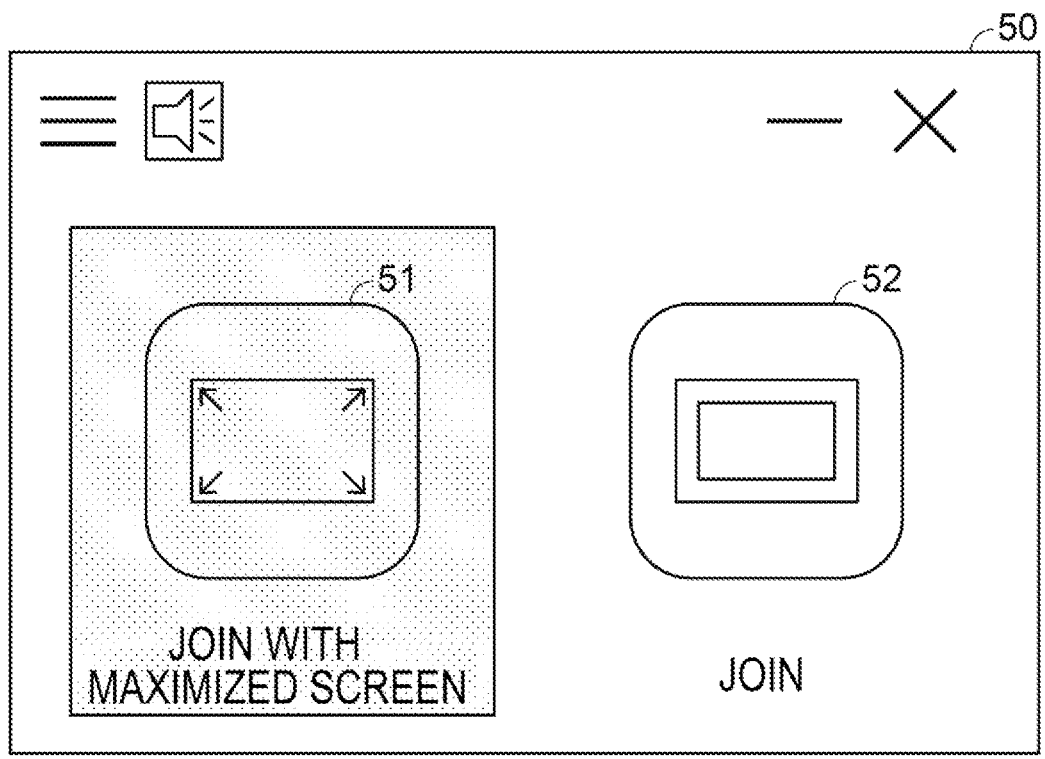
FIG. 3 describes an example of an operation screen.

In response to the permission signal, the control circuit 12 of the first terminal 10A displays on the display section 14 an operation screen 50 containing, for example, a first button 51 labeled with "Join with maximized screen" and a second button 52 labeled with "Join", as shown in FIG. 3. It is, however, noted in the example shown in FIG. 3 that the operation screen 50 is, for example, grayed out so as to indicate that the operation on the first button 51 is disabled. When the control circuit 12 detects the operation performed on the second button 52 in response to the user's operation performed on the input section 13, the control circuit 12 transmits an instruction signal instructing placement of the first image on the first screen and the image data representing the first image to the display apparatus 20.

The processing circuit 23 of the display apparatus 20 generates the first screen formed of the single first image in response to the instruction signal instructing the placement of the first image, and the display device 26 displays the first screen as the video 40. When the image displayed by the display apparatus 20 is only the first image acquired from the first terminal 10A, the display device 26 displays the first image across the entire screen. That is, the display device 26 maximizes and displays the first image from the first terminal 10A.

Figure 4:
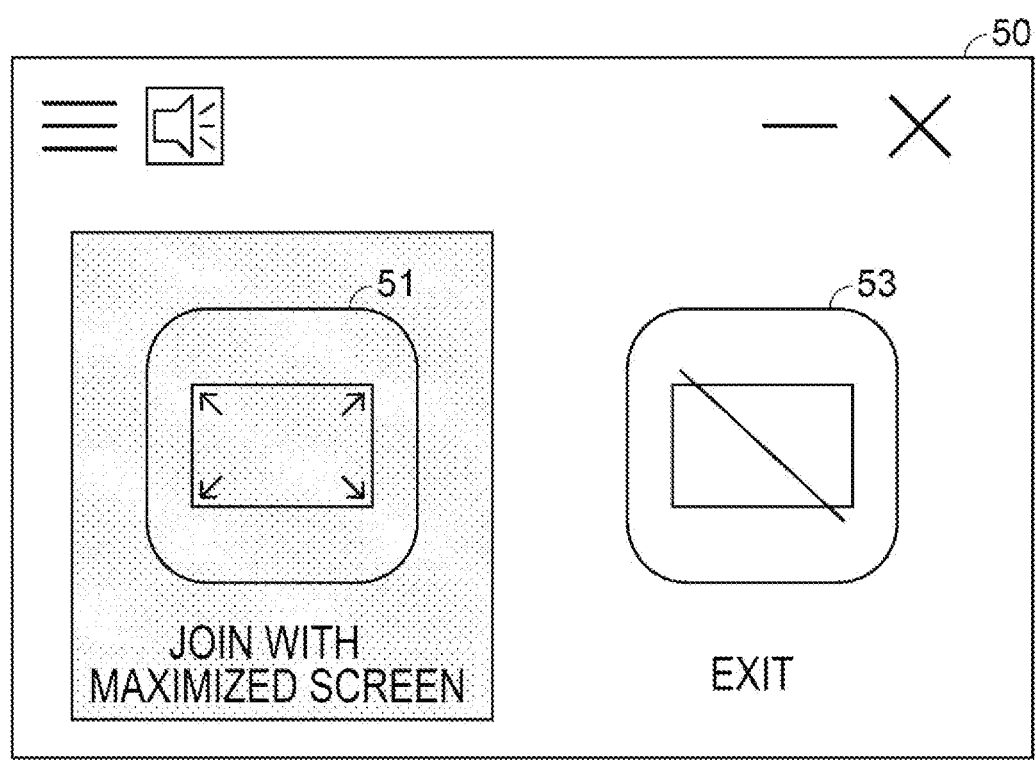
FIG. 4 describes another example of the operation screen.

In this case, the control circuit 12 of the first terminal 10A displays on the display section 14 the operation screen 50 containing, for example, the disabled first button 51 and a third button 53 labeled with "Exit", as shown in FIG. 4. When the control circuit 12 detects the operation performed on the third button 53 in response to the user's operation performed on the input section 13, the control circuit 12 transmits to the display apparatus 20 an instruction signal instructing termination of the display of the supplied first images. The processing circuit 23 of the display apparatus 20 terminates the generation of the first screen formed of the single first image in response to the instruction signal instructing termination of the display of the first image to terminate the display of the first screen on the display device 26.

Assume now a case where the display apparatus 20 is displaying only the first image from the first terminal 10A, and another first terminal 10B requests the display apparatus 20 to display a first image from the first terminal 10B. The control circuit 12 of the first terminal 10B transmits a request signal requesting the display of the first image to the display apparatus 20 via the communication section 11 in response to the user's operation performed on the input section 13. In response to the request signal, the display apparatus 20 permits the first terminal 10B to place the first images from the first terminal 10B on the first screen or display a second screen formed of the first image from the first terminal 10B. The second screen is a screen different from the first screen and is, for example, displayed across the entire screen so that the second screen is superimposed on the first screen. For example, the second screen is the same as the first screen in terms of size, as the video 40 displayed by the display device 26. The second screen is processed, for example, by the processing circuit 23 as a layer different from the first screen.

Specifically, the processing circuit 23 of the display apparatus 20 evaluates in response to the request signal whether or not the number of first images currently placed on the first screen is equal to the maximum number of images that can be placed on the first screen. When the number of first images being placed on the first screen is smaller than the maximum number, the processing circuit 23 transmits a permission signal to the first terminal 10A, the permission signal permitting placement of the first image from the first terminal 10B on the first screen or display of the second screen formed of the first image from the first terminal 10B. That is, when the number of first images is 1 and the maximum number is 4, the display apparatus 20 permits the first terminal 10B to place the first image from the first terminal 10B on the first screen or display the second screen formed of the first images from the first terminal 10B. The first terminal 10B can thus place the first image on the first screen or display the second screen formed of the first images.

Figure 5:
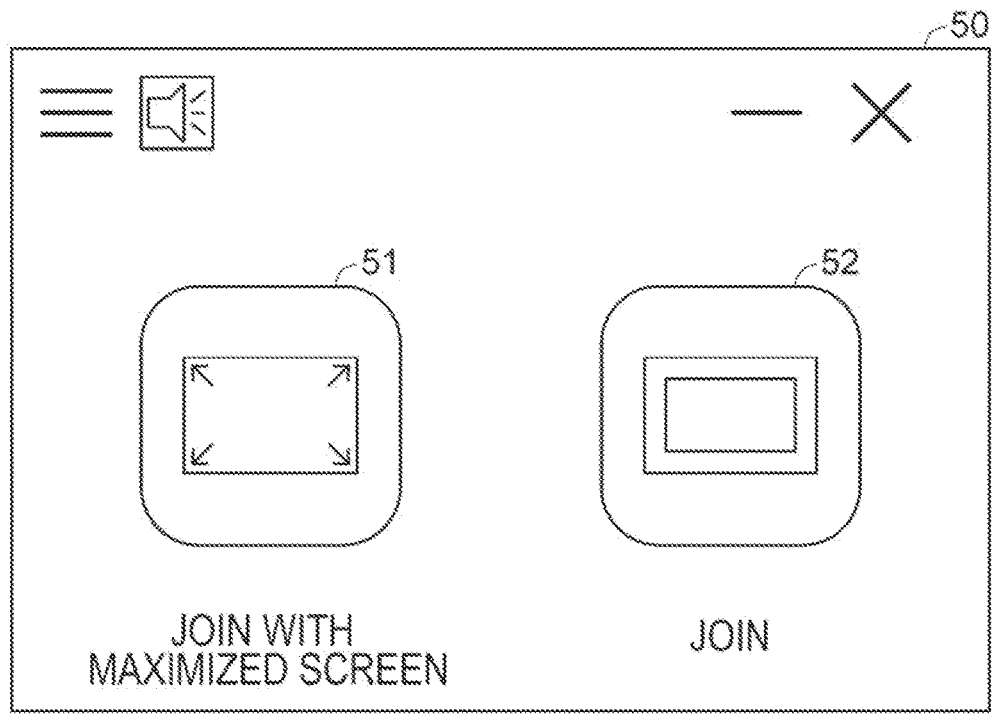
FIG. 5 describes another example of the operation screen.

In response to the permission signal, the control circuit 12 of the first terminal 10B displays on the display 14 the operation screen 50 containing the first button 51 labeled with "Join with maximized screen" and the second button 52 labeled with "Join", as shown in FIG. 5. When the control circuit 12 detects the operation performed on the first button 51 in response to the user's operation performed on the input section 13, the control circuit 12 transmits an instruction signal instructing display of the second screen formed of the first image and image data representing the first image to the display apparatus 20. The processing circuit 23 of the display apparatus 20 generates the second screen formed of the first image from the first terminal 10B in response to the instruction signal instructing display of the second screen, and the display device 26 displays the second screen as the video 40. That is, the display device 26 maximizes and displays the first image from the first terminal 10B.

On the other hand, when the control circuit 12 of the first terminal 10B detects the operation performed on the second button 52 in response to the user's operation performed on the input section 13, the control circuit 12 transmits an instruction signal instructing placement of the first image on the first screen and image data representing the first image to the display apparatus 20.

Figure 6:
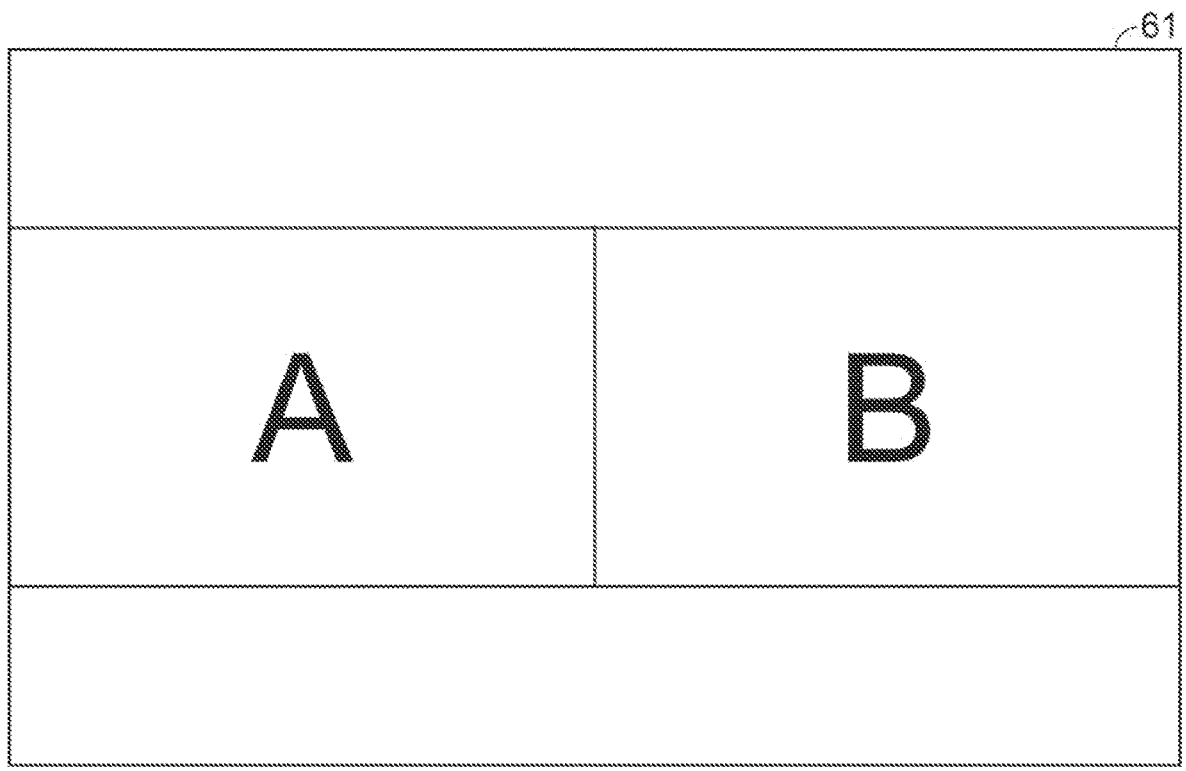
FIG. 6 describes an example of a first screen.

The processing circuit 23 of the display apparatus 20 generates a first screen 61, in which two first images acquired from the first terminal 10A and the first terminal 10B are placed in response to an instruction signal instructing placement on the first screen, and the display device 26 displays the first screen 61 as the video 40, as shown in FIG. 6.

Figure 7:
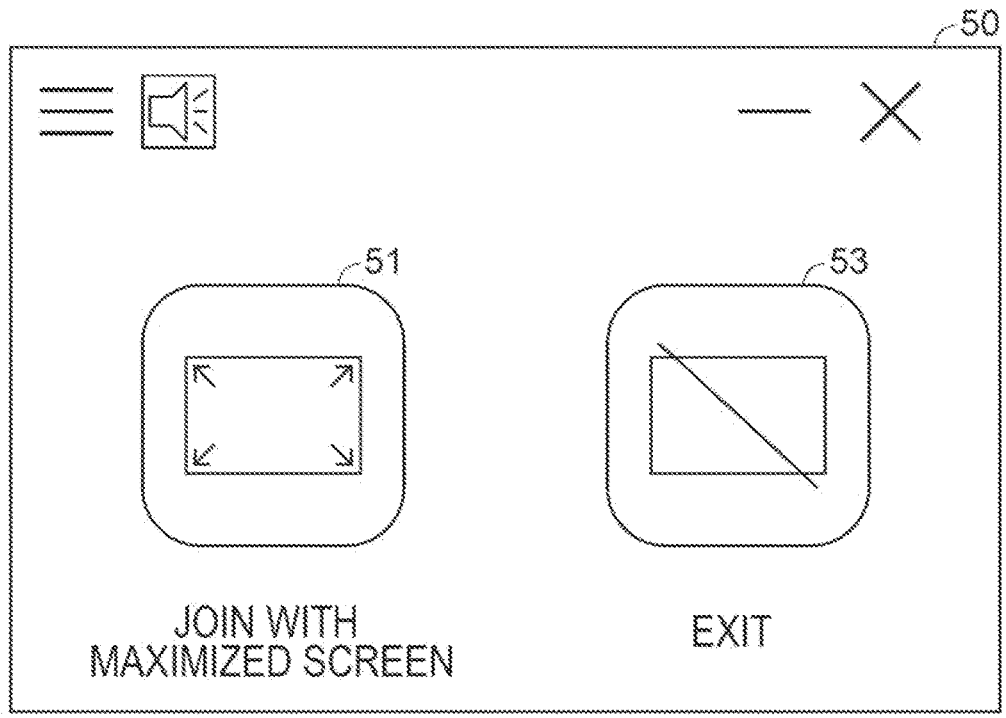
FIG. 7 describes another example of the operation screen.

In this case, the control circuit 12 of each of the first terminal 10A and the first terminal 10B displays the operation screen 50 containing the first button 51 and the third button 53 on the display section 14, as shown in FIG. 7. When the control circuit 12 detects the operation performed on the first button 51 in response to the user's operation performed on the input section 13, the control circuit 12 transmits an instruction signal instructing display of the second screen formed of the supplied first image to the display apparatus 20. The processing circuit 23 of the display apparatus 20 generates the second screen formed of the single first image in response to an instruction signal instructing the display of the second image, and the display device 26 displays the second screen.

On the other hand, when the control circuit 12 detects the operation performed on the third button 53 in response to the user's operation performed on the input section 13, the control circuit 12 transmits an instruction signal instructing deletion of the supplied first image from the first screen 61 to the display apparatus 20. The processing circuit 23 of the display apparatus 20 deletes the supplied first image from the first screen 61 on which two first images are placed in response to the instruction signal indicating deletion of the first image. As a result, the display device 26 displays the first screen formed of the remaining one first image.

Assume now a case where the display apparatus 20 displays the first screen 61 shown in FIG. 6, and the first terminal 10C, which is another terminal, requests display of the first image from the first terminal 10C. The control circuit 12 of the first terminal 10C transmits a request signal requesting display of the first image to the display apparatus 20 in response to the user's operation performed on the input section 13. In response to the request signal, the display apparatus 20 permits the first terminal 10C to place the first image from the first terminal 10C on the first screen 61 or display the second screen formed of the first image from the first terminal 10C.

Specifically, the processing circuit 23 of the display apparatus 20 evaluates in response to the request signal whether or not the number of first images currently placed on the first screen 61 is equal to the maximum number of images that can be placed on the first screen 61. When the number of first images being placed on the first screen 61 is smaller than the maximum number, the processing circuit 23 transmits a permission signal permitting placement of the first image from the first terminal 10C on the first screen 61 or display of the second screen formed of the first image from the first terminal 10C to the first terminal 10C. When the number of first images is 2 and the maximum number is 4, the display apparatus 20 permits the first terminal 10C to place the first image from the first terminal 10C on the first screen 61 or display of the second screen formed of the first image from the first terminal 10C.

In this case, the control circuit 12 of the first terminal 10C displays the operation screen 50 containing the first button 51 and the second button 52 on the display section 14 in response to the permission signal, as shown in FIG. 5. When the control circuit 12 detects the operation performed on the first button 51 in response to the user's operation performed on the input section 13, the control circuit 12 transmits an instruction signal instructing display of the second screen formed of the first image and image data representing the first image to the display apparatus 20. The processing circuit 23 of the display apparatus 20 generates the second screen formed of the first image from the first terminal 10C in response to the instruction signal instructing display of the second screen, and the display device 26 displays the second screen as the video 40. That is, the display device 26 maximizes and displays the first image from the first terminal 10C.

On the other hand, when the control circuit 12 of the first terminal 10C detects the operation performed on the second button 52 in response to the user's operation performed on the input section 13, the control circuit 12 transmits an instruction signal instructing placement of the first image on the first screen 61 and image data representing the first image to the display apparatus 20.

Figure 8:
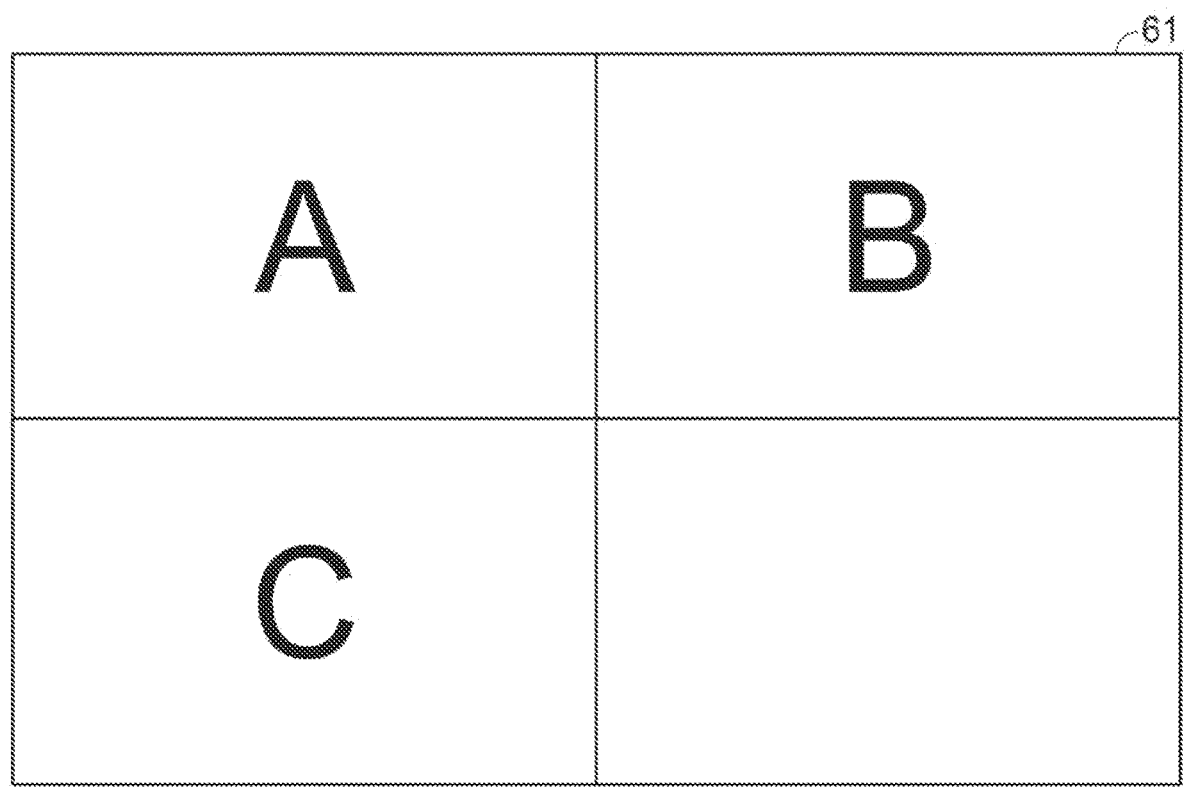
FIG. 8 describes another example of the first screen.

The processing circuit 23 of the display apparatus 20 generates, in response to an instruction signal instructing placement on the first screen 61, the first screen 61 in which three first images acquired from the first terminals 10A, 10B, and 10C are placed, as shown in FIG. 8. The processing circuit 23 displays the generated first screen 61 as the video 40 via the display device 26.

Furthermore, when the first terminal 10D, which is another terminal, requests display of the first image from the first terminal 10D, the control circuit 12 of the first terminal 10D transmits a request signal requesting display of the first image to the display apparatus 20 in response to the user's operation performed on the input section 13, as in the above description. In response to the request signal, the display apparatus 20 permits the first terminal 10D to place the first image from the first terminal 10D on the first screen 61 or display the second screen formed of the first image from the first terminal 10D.

The control circuit 12 of the first terminal 10D displays the operation screen 50 containing the first button 51 and the second button 52 on the display section 14 in response to the permission signal, as shown in FIG. 5. When the control circuit 12 detects the operation performed on the first button 51 in response to the user's operation performed on the input section 13, the control circuit 12 transmits an instruction signal instructing display of the second screen formed of the first image and image data representing the first image to the display apparatus 20. The processing circuit 23 of the display apparatus 20 generates the second screen formed of the first image from the first terminal 10D in response to the instruction signal instructing display of the second screen, and the display device 26 displays the second screen as the video 40. That is, the display device 26 maximizes and displays the first image from the first terminal 10D.

On the other hand, when the control circuit 12 of the first terminal 10D detects the operation performed on the second button 52 in response to the user's operation performed on the input section 13, the control circuit 12 transmits an instruction signal instructing placement of the first image on the first screen 61 and image data representing the first image to the display apparatus 20.

Figure 9:
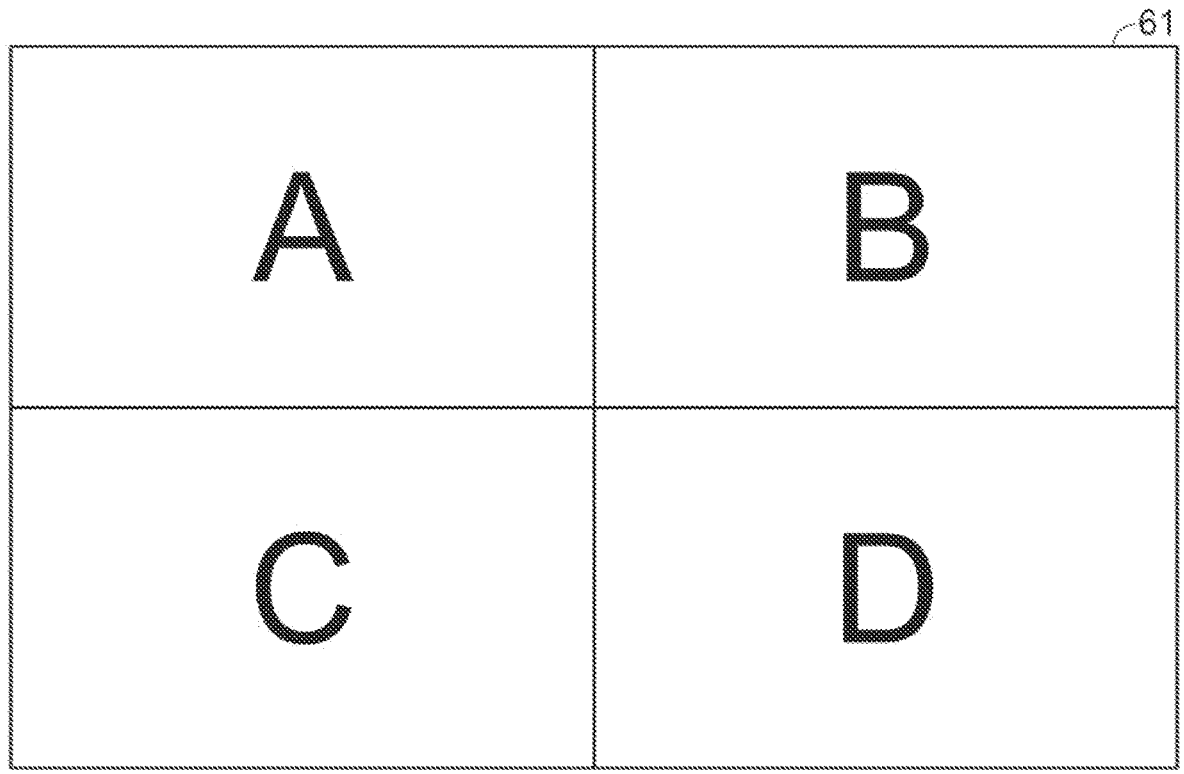
FIG. 9 describes another example of the first screen.

The processing circuit 23 of the display apparatus 20 generates the first screen 61 in which four first images acquired from the first terminals 10A, 10B, 10C and 10D are placed in response to an instruction signal instructing placement on the first screen 61, as shown in FIG. 9. The processing circuit 23 displays the generated first screen 61 as the video 40 via the display device 26.

Focusing on the second terminal 10x, which is another terminal, and a description will be made of a case where the second terminal 10x requests display of the second image in the state in which the display apparatus 20 displays the first screen 61. The control circuit 12 of the second terminal 10x transmits a request signal requesting display of the second image to the display apparatus 20 in response to the user's operation performed on the input section 13. The display apparatus 20 permits the second terminal 10x to display the second screen containing the second image from the second terminal 10x in response to the request signal.

Specifically, the processing circuit 23 of the display apparatus 20 evaluates in response to the request signal whether or not the number of first images currently placed on the first screen 61 is the maximum number of images that can be placed on the first screen 61. When the number of first images placed on the first screen 61 is equal to the maximum number, the processing circuit 23 transmits a permission signal that permits only display of the second screen containing the second image from the second terminal 10x to the second terminal 10x via the communication circuit 25. That is, for example, when the second terminal 10x transmits the request signal with the first screen 61 in FIG. 9 displayed, the processing circuit 23 permits the second terminal 10x to display the second screen containing the second image from the second terminal 10x because the number of first images is 4 and the maximum number is 4.

Figure 10:
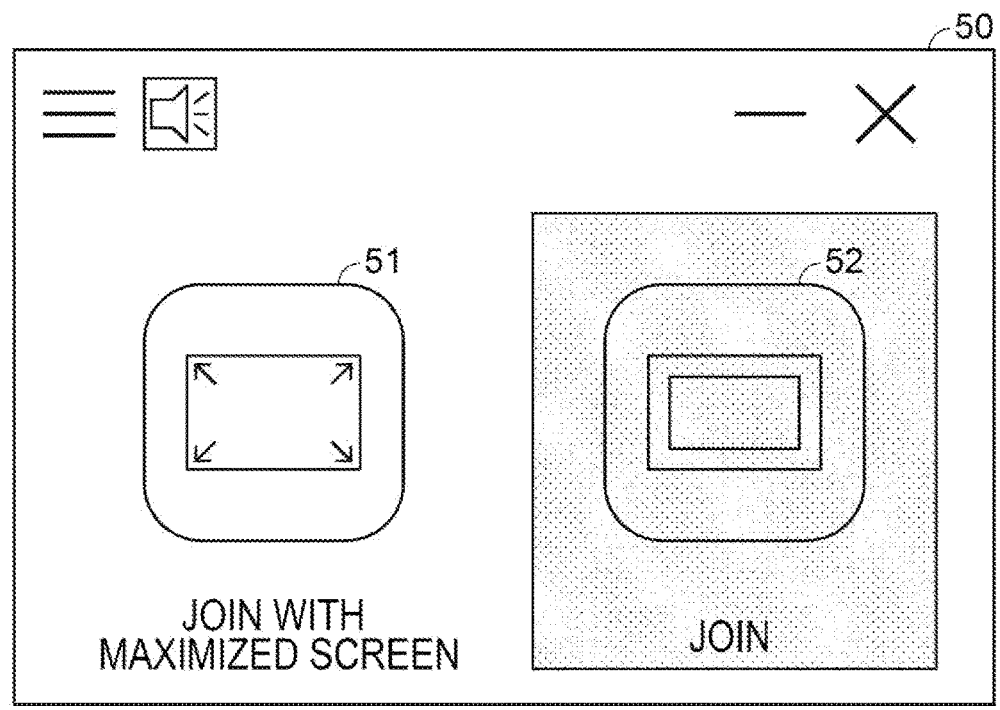
FIG. 10 describes another example of the operation screen.

The control circuit 12 of the second terminal 10x displays the operation screen 50 containing the first button 51 and the second button 52 on the display section 14 in response to the permission signal, as shown in FIG. 10. It is, however, noted in the example shown in FIG. 10 that the operation screen 50 is, for example, grayed out so as to indicate that the operation on the second button 52 is disabled. When the control circuit 12 detects the operation performed on the first button 51 in response to the user's operation performed on the input section 13, the control circuit 12 transmits an instruction signal instructing display of the second screen containing the second image and image data representing the second image to the display apparatus 20.

Figure 11:
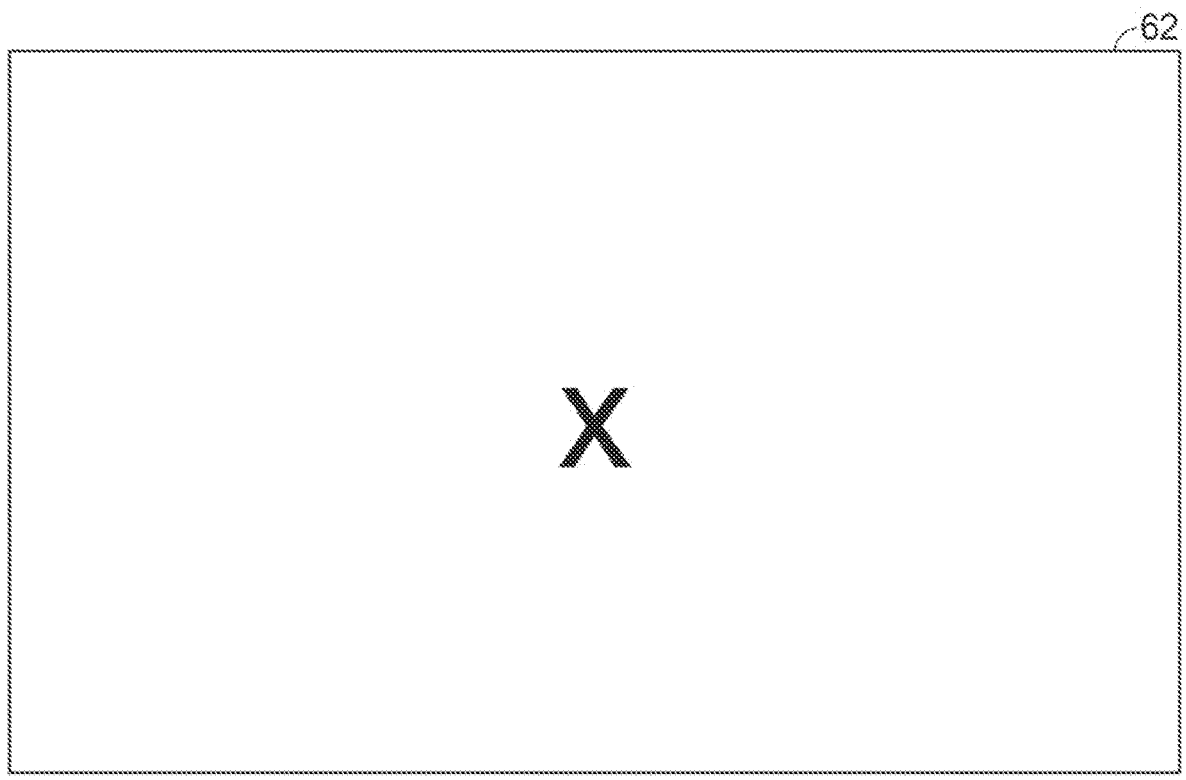
FIG. 11 describes an example of a second screen.

The processing circuit 23 of the display apparatus 20 generates a second screen 62 formed of the single second image in response to an instruction signal instructing display of the second screen, and the display device 26 displays the second screen 62 as the video 40, as shown in FIG. 11. That is, the display device 26 maximizes and displays the second image from the second terminal 10x.

On the other hand, when the number of first images placed on the first screen 61 is smaller than the maximum number, the processing circuit 23 of the display apparatus 20 transmits a permission signal to the second terminal 10x that permits placement of the second image from the second terminal 10x on the first screen 61 or display of the second screen 62 containing the second image from the second terminal 10x. That is, for example, when the second terminal 10x transmits the request signal with the first screen 61 in FIG. 8 displayed, the display apparatus 20 permits the second terminal 10x to place the second image from the second terminal 10x on the first screen 61 or display of the second screen 62 containing the second image from the second terminal 10x because the number of first images is 3 and the maximum number is 4. The second terminal 10x can thus place the second image on the first screen 61 or display the second screen 62 containing the second image.

In this case, the control circuit 12 of the second terminal 10x displays the operation screen 50 containing the first button 51 and the second button 52 on the display section 14 in response to the permission signal, as shown in FIG. 5. When the control circuit 12 detects the operation performed on the first button 51 in response to the user's operation performed on the input section 13, the control circuit 12 transmits an instruction signal instructing display of the second screen 62 formed of the second image and image data representing the second image to the display apparatus 20. The processing circuit 23 of the display apparatus 20 displays the second screen 62 in FIG. 11 as the video 40 via the display device 26 in response to the instruction signal instructing display of the second screen 62.

On the other hand, when the control circuit 12 detects the operation performed on the second button 52, the control circuit 12 transmits an instruction signal instructing placement of the second image on the first screen 61 to the display apparatus 20. The processing circuit 23 of the display apparatus 20 generates the first screen 61 in which a plurality of first and second images are placed in response to the instruction signal instructing placement of the second image, and the display device 26 displays the generated first screen 61.

While the second screen 62 containing the second image from the second terminal 10x is displayed, the control circuit 12 of the second terminal 10x displays the operation screen 50 containing the disabled first button 51 and the operable third button 53 on the display section 14, as shown in FIG. 4. When the control circuit 12 detects the operation performed on the third button 53 in response to the user's operation performed on the input section 13, the control circuit 12 transmits an instruction signal instructing termination of the display of the second screen 62 to the display apparatus 20. In response to the instruction signal instructing termination of the display of the second screen 62, the processing circuit 23 of the display apparatus 20 terminates the display of the second screen 62 and displays the first screen 61 in the state immediately before the second screen 62 is displayed. The processing circuit 23 can restore the first screen 61 in the state immediately before the second screen 62 is displayed, for example, by storing the first screen 61 and the second screen 62 as different layers in the storage circuit 24.

Figure 12:
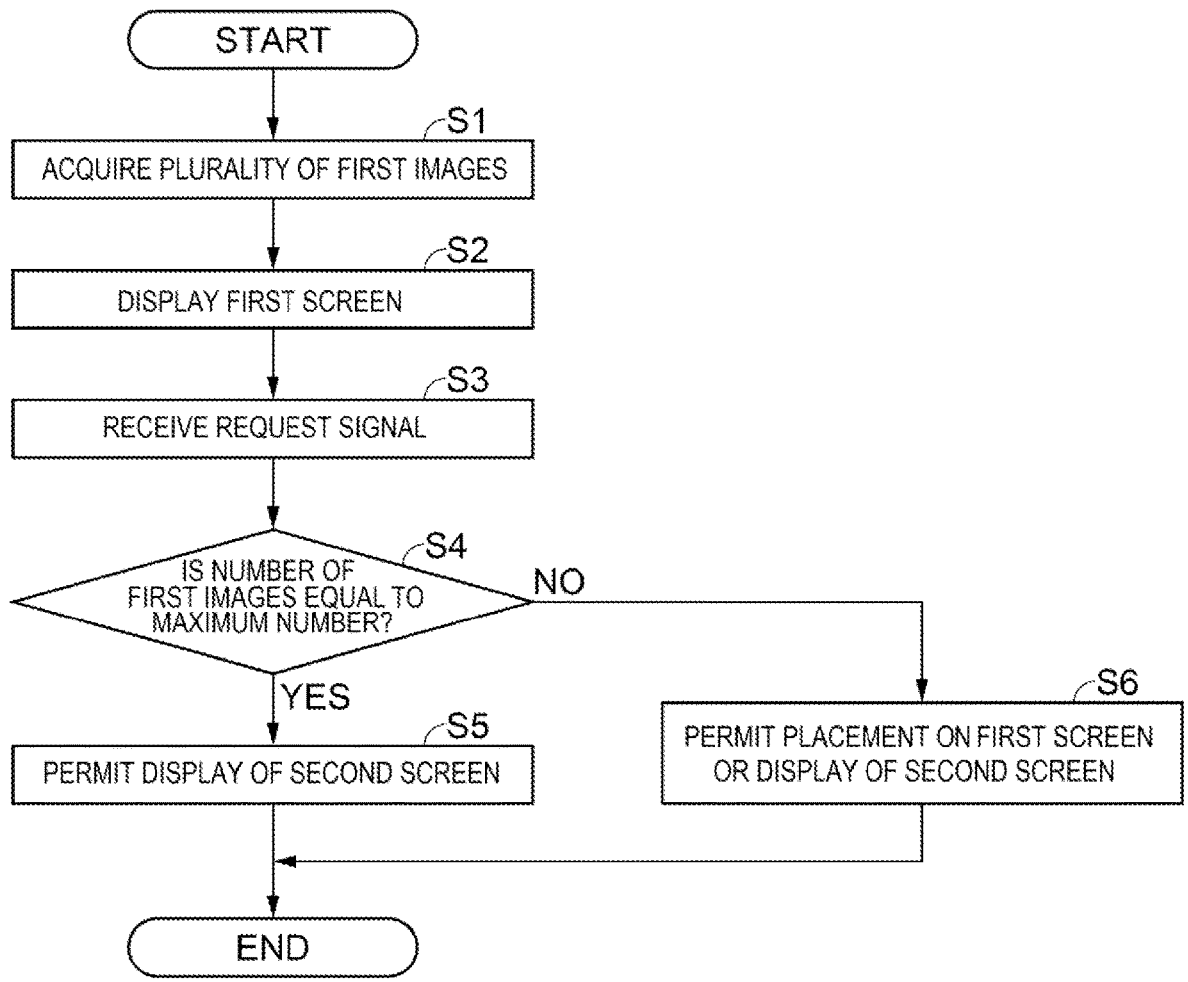
FIG. 12 is a flowchart for describing a method for controlling a display apparatus according to the embodiment.

The method for controlling the display apparatus 20 described above will be described, as an example of the action of the display system 1 according to the embodiment, with reference to the flowchart in FIG. 12.

First, in step S1, the communication circuit 25 of the display apparatus 20 acquires a plurality of first images from the plurality of first terminals 10A to 10D under the control of the processing circuit 23. In step S2, the display device 26 displays the first screen 61 on which the plurality of first images are placed under the control of the processing circuit 23. In step S3, the processing circuit 23 receives a request signal requesting display of the second image from the second terminal 10x, which supplies the second image, via the communication circuit 25.

In step S4, the processing circuit 23 evaluates in response to the request signal whether or not the number of first images currently placed on the first screen 61 is equal to the maximum number of images that can be placed on the first screen 61. When the number of first images is equal to the maximum number, the processing circuit 23 proceeds to the process in step S5, whereas when the number of first images is smaller than the maximum number, the processing circuit 23 proceeds to the process in step S6.

In step S5, the processing circuit 23 transmits a permission signal that permits display of the second screen 62 to the second terminal 10x via the communication circuit 25. That is, the processing circuit 23 permits the second terminal 10x to display the second screen 62 containing the second image from the second terminal 10x via the display device 26. The second terminal 10x thus displays the operation screen 50 via which the user instructs the display apparatus 20 to display the second screen 62 containing the second image, as shown, for example, in FIG. 10.

In step S6, the processing circuit 23 transmits a permission signal that permits placement of the second image on the first screen 61 or display of the second screen 62 to the second terminal 10x. That is, the processing circuit 23 permits the second terminal 10x to place the second image from the second terminal 10x on the first screen 61 or display of the second screen 62 containing the second image from the second terminal 10x via the display device 26. The second terminal 10x thus displays the operation screen 50 via which the user instructs the display apparatus 20 to place the second image on the first screen 61 or display the second screen 62 containing the second image, as shown, for example, in FIG. 5.

In the display system 1 according to the embodiment, when the display apparatus 20 is requested to display the second image from the second terminal 10x, and the number of first images being placed on the first screen 61 is equal to the maximum number of images that can be placed on the first screen 61, the display apparatus 20 displays the second screen 62 containing the second image. As a result, even when the number of first images being placed on the first screen 61 is equal to the maximum number, the display apparatus 20 can readily display the second image with no need for an operation, such as the operation of replacing a first image having been already displayed with the second image.

Furthermore, in the display system 1 according to the embodiment, when an instruction of termination of the display of the second screen 62 is issued from the second terminal 10x, the first screen 61 in the state immediately before the display of the second screen 62 is displayed. The thus configured display system 1 can prevent the state in which the termination of the display of the second screen 62 causes no image from any terminal 10 to be displayed as the video 40 displayed by the display device 26.

The embodiment has been described above, but the present disclosure is not limited to the disclosed embodiment. The configuration of each portion may be replaced with an arbitrary configuration having the same function, and an arbitrary configuration in the embodiment may be omitted or added within the technical scope of the present disclosure. The disclosure of such replacement, omission, and addition allows a person skilled in the art to conceive of a variety of alternative embodiments.

For example, the size of the second screen 62 in the video 40 may be smaller than the size of the first screen 61. For example, when the first screen 61 containing four first images has been already displayed, the second screen 62 may be displayed so as to replace any one of the first images. Furthermore, a second screen 62 larger than the first images on the first screen 61 but smaller than the first screen may be displayed at the center of the video 40.

For example, the controller 22 and the communication circuit 25 of the display apparatus 20 may be provided in an enclosure separate from the enclosure of the display apparatus 20. That is, the display system 1 may be formed of an image processing apparatus including a controller that functions as the controller 22 and a communication circuit that functions as the communication circuit 25, and a display apparatus having the function of the display device 26. In this case, the image processing apparatus described above, which is capable of executing steps S1 to S6 in FIG. 12, outputs image data to the display apparatus described above.

For example, the maximum number stored in the storage circuit 24 may be changeable.

In addition to the above, the present disclosure, of course, encompasses a variety of embodiments that have not been described above, such as a configuration to which the configurations described above are mutually applied. The technical scope of the present disclosure is specified only by the inventive specific items according to the claims reasonably derived from the above description.

What is claimed is:

1. A method for controlling a display apparatus, the method comprising:
    acquiring a plurality of first images from a plurality of first terminals;
    displaying a first screen on which the plurality of first images are placed via a display device;
    storing a maximum number of first images to be placed on the first screen in a storage circuit;
    in response to a signal transmitted from a second terminal that supplies a second image and requesting display of the second image, permitting the second terminal to display a second screen containing the second image but not containing the first images via the display device when the number of first images being placed on the first screen is equal to the maximum number; and
    in response to the signal transmitted from the second terminal, permitting the second terminal to place the second image on the first screen when the number of first images being placed on the first screen is smaller than the maximum number.

2. The method for controlling a display apparatus according to claim 1, wherein the second terminal is permitted to display the second screen via the display device when the number of first images being placed on the first screen is smaller than the maximum number.

3. The method for controlling a display apparatus according to claim 1, wherein the second screen has a size equal to a size of the first screen.

4. The method for controlling a display apparatus according to claim 1, further comprising:
    displaying the second screen; and
    terminating the display of the second screen and displaying the first screen that has been displayed immediately before the second screen is displayed in response to a signal instructing termination of the display of the second screen.

5. A display apparatus comprising:
    a communication circuit that acquires a plurality of first images from a plurality of first terminals;
    a display device that displays a first screen on which the plurality of first images are placed;
    a storage circuit that stores a maximum number of first images to be placed on the first screen; and
    a processing circuit that,
        in response to a signal transmitted from a second terminal that supplies a second image and requesting display of the second image, permits the second terminal to display a second screen containing the second image but not containing the first images on the display device when the number of first images being placed on the first screen is equal to the maximum number, and
        in response to the signal transmitted from the second terminal, permits the second terminal to place the second image on the first screen when the number of first images being placed on the first screen is smaller than the maximum number.

6. A method for controlling an image processing apparatus, the method comprising:
    acquiring a plurality of first images from a plurality of first terminals;
    transmitting a first screen on which the plurality of first images are placed to a display device;
    storing a maximum number of first images to be placed on the first screen in a storage circuit;
    in response to a signal transmitted from a second terminal that supplies a second image and requesting display of the second image, permitting the second terminal to display a second screen containing the second image but not containing the first images via the display device when the number of first images being placed on the first screen is equal to the maximum number; and
    in response to the signal transmitted from the second terminal, permitting the second terminal to place the second image on the first screen when the number of first images being placed on the first screen is smaller than the maximum number.

* * * * *